INVENTOR.
PHILLIP G. WOOD
BY
Joseph G. Werner
ATTORNEY

April 18, 1967 P. G. WOOD 3,314,454
CONTAINER FILLING APPARATUS
Filed April 19, 1965 5 Sheets-Sheet 4

INVENTOR.
PHILLIP G. WOOD
BY
Joseph G. Werner
ATTORNEY

United States Patent Office 3,314,454
Patented Apr. 18, 1967

3,314,454
CONTAINER FILLING APPARATUS
Phillip G. Wood, 210 E. Cedar St.,
Pulaski, Wis. 54162
Filed Apr. 19, 1965, Ser. No. 449,040
6 Claims. (Cl. 141—72)

My invention relates generally to container filling apparatus, and more particularly to high-speed apparatus for continuously advancing a plurality of open-topped, substantially rigid containers and compactly filling same with produce.

My container filling apparatus may generally include an endless filling belt having a plurality of openings and a lower run which extends along a substantially straight path, a drive chain attached to the side of said filling belt and carried by a track along the lower run of the belt, drive mechanism for continuously advancing the drive chain and attached filling belt, an oscillating mechanism for vibrating the track to impart vibration to the lower run of the filling belt during continuous movement thereof, a conveyor for continuously advancing a plurality of containers in upright position along a substantially straight path in alignment with and at the same speed as the openings in the filling belt, and an endless produce conveyor belt disposed above the filling belt for continuously delivering produce by gravity to the lower run of the filling belt for discharge through the belt openings and into the containers. In addition my apparatus may also include: a plurality of plows disposed above the produce conveyor belt to plow produce off the conveyor belt and onto the filling belt; mechanism for vibrating the containers while produce is being discharged thereinto; and filling chutes depending from the filling belt to direct produce from the belt openings into the containers.

While my invention may be employed for compactly filling any open-topped, substantially rigid container with any substantially solid commodity which will not be damaged or otherwise adversely affected by short falls and vibrations, and it is particularly well suited for compactly filling jars with farm produce, such as for example, pickles, olives, peppers, beets, apples, beans and the like, in whole, sliced or diced form.

When packing farm produce of irregular shape into containers, it is important that each container be packed with at least a pre-determined quantity or weight of such produce, and there is, of course, an important economic advantage gained in the highly competitive food packing industry if the containers can be compactly filled at increased speeds while at the same time decreasing the spillage and waste of the foodstuffs. It is also extremely important in the food packing industry that filling apparatus for handling the food be easy to clean, preferably by hosing with water, and that all portions of the apparatus be easily accessible for servicing.

One known container filling apparatus provides a stationary produce supply chute and means for intermittently advancing a plurality of containers sequentially under the chute. While this known apparatus provides quite accurate delivery of the produce to the containers and therefore minimizes spillage and waste, the containers must be brought to a stop during the filling operation which severely limits the number of containers that can be filled in a given time.

Another known container filling apparatus or produce packer provides conveyor means for continuously advancing a plurality of containers in single-file under a vibrating produce chute and a rotating drum encircling the chute and conveyor for supplying produce to the vibrating chutes. Since the filling chute does not move along with the continuously moving containers, a substantial amount of the produce dropped by the supply chute misses the advancing containers and falls between the mouths of adjacent containers. Although most of the spilled produce is caught by the drum and redistributed, the fact that a substantial amount of the produce dropped from the chute does miss the containers makes this packer inefficient in operation and limits its productivity. In addition, these drum-type container filling machines have the disadvantage that they are difficult to clean and service because most of the operational parts of the produce handling apparatus are within the rotating drum.

Accordingly, it is an object of my invention to provide a new and improved apparatus for compactly filling open-topped, substantially rigid containers with produce.

Another object of my invention is to provide new and improved container filling apparatus having a continuously advancing filling belt which is adapted to move in timed relation above a plurality of continuously advancing containers.

Another object of my invention is to provide a new filling apparatus having a continuously advancing filling belt which is adapted to move in timed relation above a plurality of continuously advancing containers and means for vibrating both the filling belt and the containers.

A further object of my invention is to provide high-speed container filling apparatus having a pair of continuously advancing filling belts having a plurality of depending filling chutes adapted to be moved in timed relation above two single-file lines of continuously advancing containers.

A still further object of my invention is to provide new and improved container filling apparatus wherein the parts thereof are readily accessible for cleaning and servicing.

Further objects, features and advantages of my invention will be apparent from the following detailed description taken in conjunction with the accompanying drawings showing a preferred exemplary embodiment of my invention.

Figure 1:
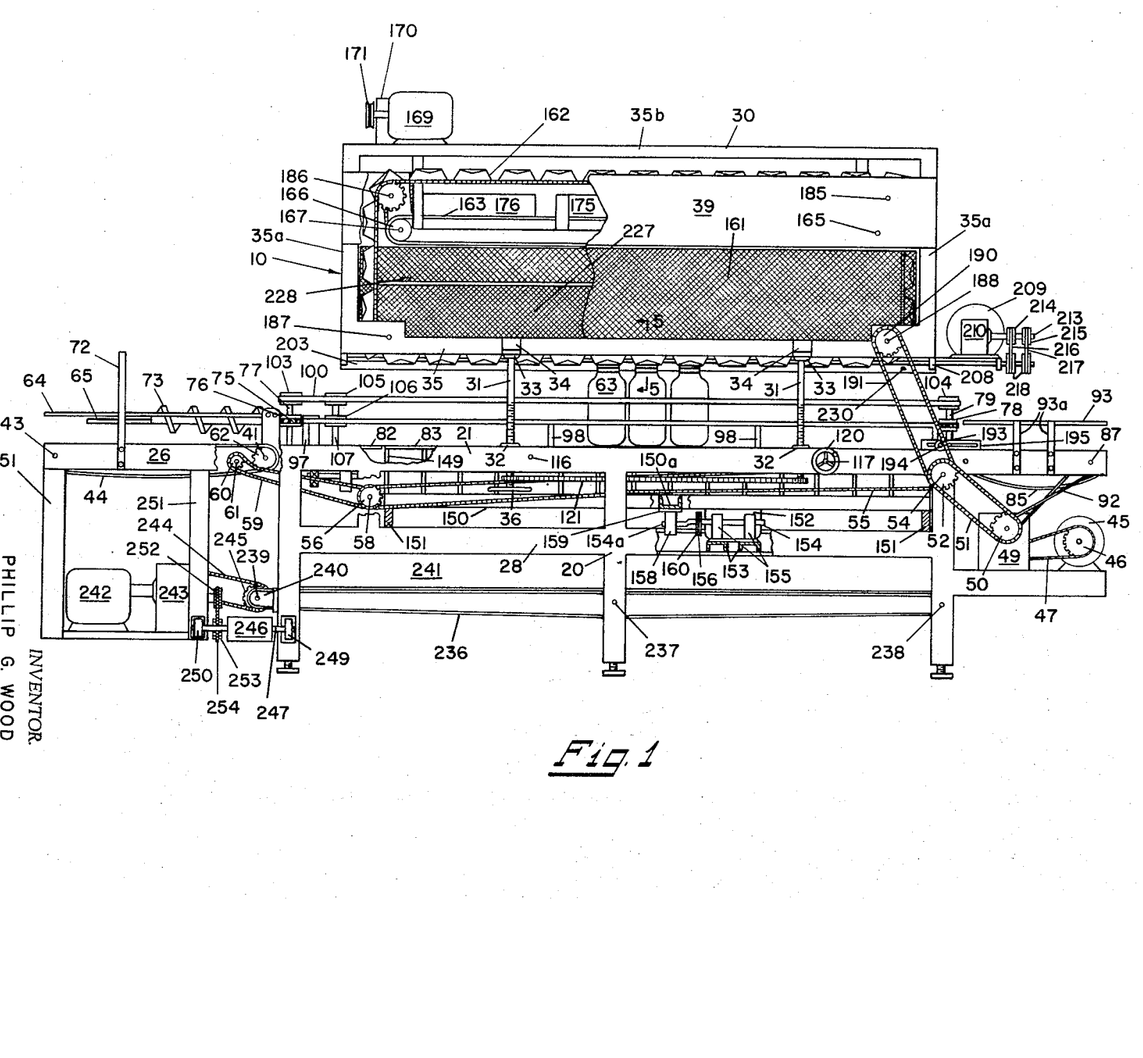
FIG. 1 is a side elevation view of my container filling apparatus with parts thereof broken away and other parts removed.
Figure 2:
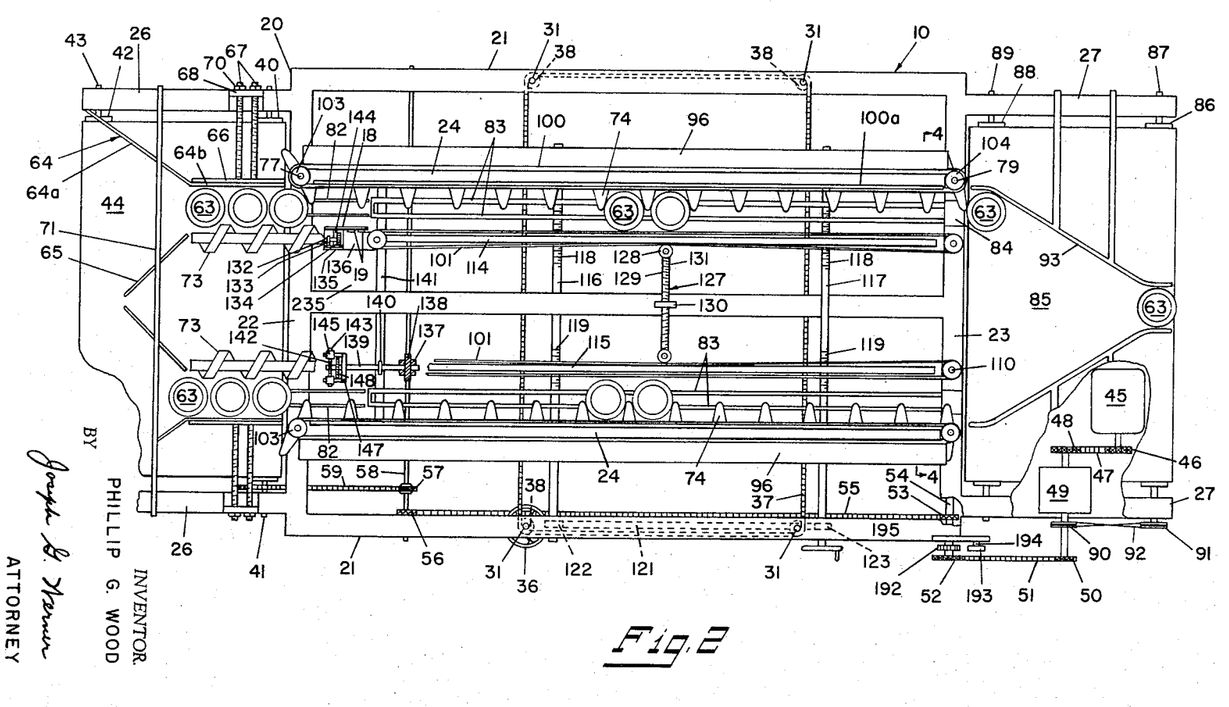
FIG. 2 is a plan view of my container filling apparatus with the hopper section and the inner guide belt supporting channels removed and with other parts broken away.
Figure 3:
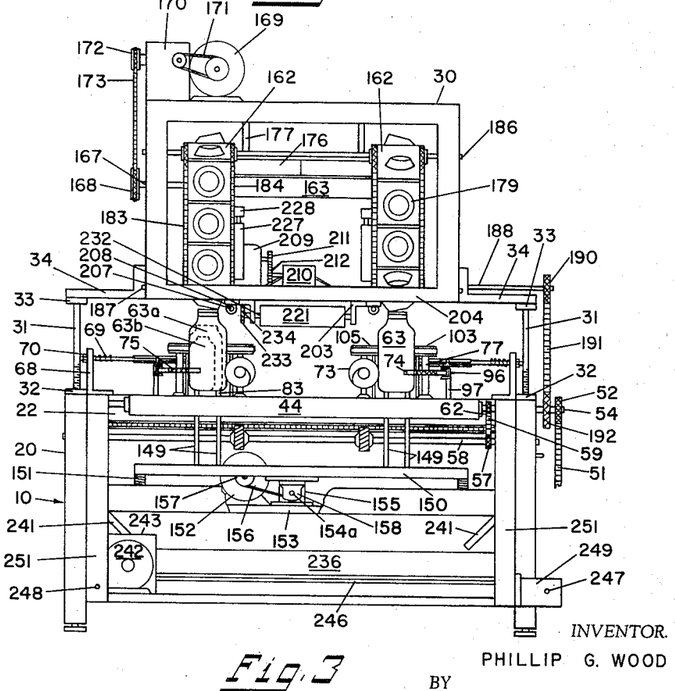
FIG. 3 is an elevation view of the container infeed end of my filling apparatus with the infeed guide bars removed and other parts broken away.

Referring now more particularly to FIGS. 1–3, my container filling apparatus is generally shown at 10 and has a main frame 20 and a hopper frame 30 supported above the main frame by four threaded supporting studs 31. As best seen in FIG. 2, the main frame 20 has a pair of longitudinal main members 21 connected at their ends by a pair of transverse main members 22 and 23. Main frame 20 also has a pair of longitudinal secondary members 24 and a center member 25 rigidly attached at their ends to transverse main members 22 and 23. Main frame 20 has a pair of upper forward extension members 26 fixedly secured to the transverse main member 22 at the forward end of filling apparatus 10.

The forward extension members 26 support a container input conveyor comprising a drive roller 40 mounted on a drive shaft 41, an idler roller 42 mounted on an idler shaft 43, and an endless conveyor belt 44 trained over rollers 40 and 42. FIGS. 1–3 show that the drive shaft 41 of the container unit conveyor is driven by a variable speed motor 45 located at the opposite end of apparatus 10 through drive mechanism comprising sprocket 46, drive chain 47, sprocket 48 on the shaft of reducer box 49, sprocket 50, drive chain 51, sprockets 52 and 53 mounted on main drive shaft 54, drive chain 55, sprockets 56 and 57 mounted on secondary drive shaft 58, chain 59 trained over sprocket 57 and sprocket 60 on jack-shaft 61, and sprocket 62 which is mounted on the drive shaft 41 of the container infeed conveyor. As best seen in FIG. 1, sprocket 62 is driven off the back of chain 59.

Containers such as those shown at 63 in FIG. 2, which are placed on the input conveyor belt 44 and advanced thereby, will be formed into two single-file lines by guide bars 64 and separator bars 65. The guide bars 64 are preferably made of nylon and have converging forward sections 64a and longitudinal sections 64b. The longitudinal sections 64b are suitably attached to substantially rigid backing bars 66. The backing bars 66 are each supported by a pair of elongated studs 67 which are fixedly secured to backing bars 66 and which are slidably received at their other end in angle brackets 68 which are fixedly attached to upper forward extension members 26. Each elongated stud 67 carries a coil spring 69 thereon between backing bar 66 and bracket 68. The coil springs 69, thus, bias the guide bars 64 inwardly toward the containers 63. The movement of the guide bars 64 toward the containers 63 is limited by nuts 70 which are threaded onto the elongated studs 67. By adjusting the nuts 70 on elongated studs 67, the guide bars 64 may be moved inwardly or outwardly to accommodate various size containers.

The pair of separator bars 65 are positioned to form a V-shaped plough for separating the containers placed on conveyor belt 44 into two lines by forcing the containers outwardly toward the guide bars 64. As best seen in FIGS. 1 and 2, the separator bars 65 are suspended above the container conveyor belt 44 by depending portions of transverse support bar 71 which in turn is supported at its end by a pair of upright support bars 72 which are rigidly attached to the forward extension members 26. The transverse support bar is spaced well above conveyor belt 44 so as to allow containers 63 to pass thereunder. The separator bars 65 are preferably adjustably mounted on the depending portions of transverse support bar 71 to accommodate various size containers.

Figure 4:
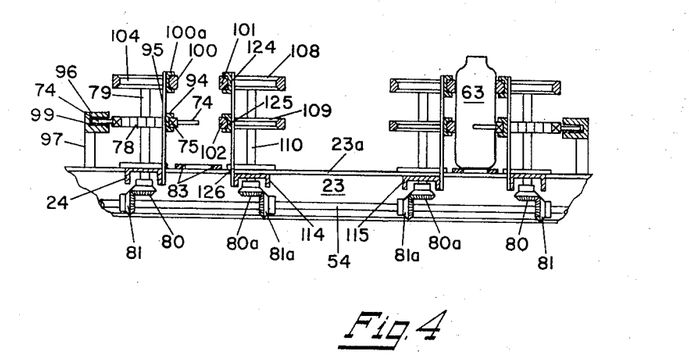
FIG. 4 is a sectional view taken along line 4—4 of FIG. 2.

A pair of nylon covered timing screws 73 engage the containers 63 on the container infeed belt 44 and insert them between nylon lugs 74 on container conveyor chains 75. As best seen in FIG. 1, the container conveyor chains 75 are trained over idler sprockets 76 mounted on upright idler shafts 77 which are rotatably mounted on the transverse main member 22 at the infeed end of apparatus 10. As best seen in FIGS. 1 and 4, at the other end of apparatus 10, the container conveyor chains 75 are trained over drive sprockets 78 mounted on upright drive shafts 79 mounted for rotation on the transverse main member 23. In FIG. 4, the drive shafts 79 are shown to extend below the top flange 23a of transverse main member 23 and the lower ends of the drive shafts 79 have bevel gears 80 fixedly attached thereto. The bevel gears 80 engage and are driven by bevel gears 81 which are fixedly attached to the main drive shaft 54.

As best seen in FIG. 2, each line of containers 63 which is being continuously advanced by lugged container conveyor chains 75 is initially supported on a pair of cantilevered rails 82 securely attached to the top of transverse main member 22 at the infeed end of my apparatus. Preferably, the rails 82 comprise substantially rigid steel strips which may be covered with a strip of nylon or the like to allow easy sliding of containers 63.

As the containers 63 in each line are advanced beyond the ends of rails 82 they are supported by a second pair of rails 83 extending between rails 82 and main transverse member 23. Rails 83 also preferably comprise substantially rigid steel strips covered with thin nylon strips. The rails 83 are mounted for vertical oscillation as will be more fully discussed hereinafter. As the containers in each line pass beyond the rear ends of rails 83 they are advanced across main transverse member 23 of the frame 20 on a nylon plate 84 which is attached on the top flange 23a of main transverse member 23 and they are then deposited on a container output conveyor belt 85. As best seen in FIG. 2, the container output conveyor belt 85 is trained over drive roller 86 mounted on a drive shaft 87, and idler roller 88 mounted on an idler shaft 89. The shafts 87 and 89 are rotatably mounted in upper rear extension members 27 of the main frame 20. The drive shaft 87 of the container output conveyor is driven from reducer 49 via pulley 90, pulley 91 mounted on the end of shaft 87, and a twisted V-belt 92 trained over pulleys 90 and 91.

As best seen in FIG. 2, as the two lines of containers are deposited on output conveyor belt 85, containers 63 are plowed into a single line by converging guide bars 93. Guide bars 93 are supported above the output conveyor belt 85 by support bars 93a bolted to rear extension members 27 as shown in FIG. 1. Bars 93 may have protective nylon strips thereon. FIG. 2 shows that the two lines of containers are staggered so as to allow the containers to be easily formed into a single line. Output conveyor 85 travels at twice the speed of input conveyor 44.

As best seen in FIG. 4, the inside runs of the container conveyor chains 75 are supported in inwardly facing elongated channels 94 mounted on the secondary longitudinal members 24 of main frame 20 by upright members 95. On the outside runs of the conveyor chains 75 the lugs 74 are supported in inwardly facing elongated channels 96 which are supported at their ends by upright members 97 fixedly attached to main transverse members 22 and 23 and by members 98 (see FIG. 1) fixedly attached to the secondary longitudinal members 24 of main frame 20. The channels 96 may have a nylon strip 99 therein to reduce the drag on the conveyor chains 75.

As the containers 63 in each line are advanced by the lugged conveyor chains 75 through container filling apparatus on rails 83, they are gripped by endless guide belts 100, 101 and 102. The guide belts 100 are carried on idler pulleys 103 mounted on idler shafts 77 above the conveyor chain idler sprockets 76 and on drive pulleys 104 mounted on upright drive shafts 79 above conveyor chain drive sprockets 78. As best seen in FIG. 4, the inside runs of belts 100 are supported in a channel 100a mounted above frame 20 by supports 95.

The guide belts 101 and 102 are positioned on the inside of container supporting rails 83 for guiding containers 63 through filling apparatus 10 along rails 83 and for holding the containers against the lugged conveyor chains 75 and guide belts 100. The guide belts 101 and 102 are trained over upper and lower idler pulleys 105 and 106, respectively, which are mounted on idler shafts 107 at the input end of filling apparatus 10. As best seen in FIG. 4, at the other end of apparatus 10, belts 101 and 102 are trained over drive pulleys 108 and 109, respectively, mounted on upright drive shafts 110 rotatably mounted on transverse main members 23 of frame 20. The inside guide belts 101 and 102 are driven by the upright drive shafts 110 which are mounted in the rear transverse main frame member 23. As best seen in FIG. 4, the drive shafts 110 extend below the upper flange 23a of the transverse main member 23 and the lower ends of shafts 110 have bevel gears 80a fixedly attached thereto. The bevel gears 80a are driven by bevel gears 81a fixedly mounted on main drive shaft 54.

The guide belts 101 and 102 and timing screws 73 are mounted for movement transversely of supporting rails 83 for varying the width of the container lanes to accommodate various size containers. Preferably, the rails 83 are positioned so that a gallon jar such as 63 shown in FIG. 3 will be centered on the rails. A quart size jar, shown in phantom at 63a in FIG. 3, will be carried slightly off-center of the rails 83 and a pint size jar such as shown in phantom at 63b will ride on just the outside rail.

Referring now to FIG. 2, the adjustable mounting for guide belts 101 and 102 and timing screws 73 comprises longitudinal beams 114 and 115 which are adjustably mounted for lateral movement on a pair of rotatable transverse rods 116 and 117. Beam 114 has a pair of right-hand threaded holes which receive the right-hand threads 118 of rotatable adjusting rods 116 and 117. Beam 115 has a pair of left-hand threaded holes therein which receive the left-hand threads 119 of rotatable adjusting rods 116 and 117. The transverse adjusting rod 117 has a hand wheel 120 attached to one end. The transverse adjusting rods 116 and 117 are connected together by a roller chain 121 trained over sprockets 122 and 123 on the rods so that the rotation imparted to rod 117 by hand wheel 120 is transmitted to adjusting rod 116 so that both ends of beams 114 and 115 are moved inwardly and outwardly an equal distance. The inside idler shafts 107 at the infeed end of my machine are rotatably mounted on the forward ends of beams 114 and 115 and, therefore, are moved inwardly and outwardly together with the beams. The drive pulleys 108 and 109 which are mounted on drive shafts 110 are rotatably mounted on rear transverse member 23 of the frame and do not move laterally with the beams 114 and 115. However, the outside runs of guide belts 101 and 102 are each supported in an elongated metal channel 124 and 125, respectively, which are fixedly attached to laterally adjustable beams 114 and 115 by upright support members 126, and, therefore, the outside runs of belts 101 and 102 are moved in and out with beams 114 and 115. The inside runs of guide belts 101 and 102 are engaged by spring-loaded tensioning devices 127 for keeping guide belts 101 and 102 under proper tension. The devices comprise a roller 128 rotatably mounted on an adjustable arm 129 which is fixedly mounted in an upstanding plate 130. Plate 130 is rigidly mounted on center frame member 25. A helical spring 131 encircles adjustable arm 129 to keep the arm extended to bias roller 128 against the inside run of guide belts 101 and 102.

Figure 7:
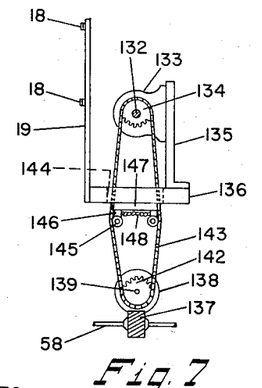
FIG. 7 is an enlarged fragmentary view showing a portion of the drive mechanism for the timing screws.

As best seen in FIGS. 2 and 7, the steel core 132 of each timing screw 73 is journaled in a bearing 133 and carries a sprocket 134 thereon. The bearings 133 are mounted on upstanding flanges 135 which are attached to supporting plates 136 mounted on the forward end of laterally adjustable beams 114 and 115. The timing screws 73 are driven from secondary drive shaft 58 which has a pair of helical gears 137 fixedly attached thereto. A portion of apparatus 10 is broken away in FIG. 2 to show the lower portion of the timing screw drive mechanism on one side of the apparatus. As shown therein and in FIG. 7, helical gears 137 drive a second pair of helical gears 138 which are fixedly mounted on jack-shafts 139. The jack-shafts 139 are journaled in bearings 140 mounted on a transverse frame member 141 which depends from longitudinal secondary frame member 24. The jack-shafts 139 carry a sprocket 142 on the end opposite helical gear 138. The sprocket 134 on the timing screws 73 is driven by a roller chain 143 which is trained over the sprocket 142. The roller chain 143 extends through a hole 144 in the support plate 136.

Since the timing screws 73 can be adjusted laterally of the machine while the jack shafts 139 cannot, a chain tensioning device is provided for keeping roller chain 143 under proper tension regardless of the lateral position of the timing screws. The tensioning device comprises a pair of rollers 145 carried on a pair of arms 146 which are slidably mounted in plate 147 and are urged apart by a spring 148. The plate 147 is fixedly attached to the bottom of plate 136 rearwardly of hole 144 so that rollers 145 extend forwardly under hole 144. Preferably, when quart-size jars are being filled by my apparatus, the timing screws 73 will be in vertical alignment with the jack shafts 139 as shown in FIG. 7. When the timing screws 73 are moved to their outermost positions to accommodate pint-size jars, chain 143 will be extended to its full length and spring 148 will be compressed a maximum amount.

As best seen in FIG. 7, nylon strips 18 mounted on supports 19, which are attached to plate 136, are provided for guiding containers 63 along rails 82.

As mentioned hereinbefore, the container supporting rails 83 are mounted for vertical oscillation for vibrating the containers to compact or settle the contents of the containers. The rails 83 are preferably supported by a plurality of upright supports 149 which are fixedly attached to a shaker frame 150 which is resiliently supported on the main frame 20 by springs 151.

As seen in FIGS. 1 and 3, a variable speed motor 152 is rigidly mounted on a pair of rigid channel-shaped cross-members 153 which are welded or otherwise rigidly connected to brace 28 of the main frame. A jack-shaft 154 having an eccentric end 154a has one end mounted in a pair of bearings 155 rigidly attached to cross-members 153. Jack-shaft 154 is driven by motor 152 through a V-belt 156 which is trained over pulley 157 on the drive shaft of motor 152 and over pulley 160 which is fixedly mounted on jack-shaft 154. The eccentric end 154a of jack-shaft 154 is received in a bearing 158 which is slidably mounted in a bronze plate 159 which is rigidly attached to a horizontal cross-member 150a of shaker frame 150. Thus, the vertical component of the rotary motion of the eccentric end 154a of jack-shaft 154 is imparted to the shaker frame 150 and, therefore, to supporting rails 83 to vertically vibrate the two lines of containers. The horizontal component of the rotary motion of eccentric end 154a of jack-shaft 154 is absorbed or lost due to the sliding of bearing 158 in bronze plate 159.

It is, of course, understood that a conventional commercially available shaker could be employed to impart vibration to containers 63 rather than the means described and shown in the drawings.

As shown in FIGS. 1 and 3, the hopper frame 30 is mounted for vertical adjustment above the main frame 20 to accommodate various size containers. The hopper frame 30 is supported by four elongated studs 31 which are threaded into bushings 32 in longitudinal main frame members 21. The studs are rotatably carried in bearings 33 in angle brackets 34 which are fixedly attached to the lower outside longitudinal members 35 of the hopper frame.

As best seen in FIGS. 1 and 2, one of studs 31 has a hand wheel 36 attached to its lower end. The studs 31 are operatively connected together by a roller chain 37 trained over a sprocket 38 on each of studs 31. Thus, the rotation imparted to the stud with the hand wheel 36 thereon, is transmitted to the other studs by the chain 37 and it is apparent that each stud will be turned an equal amount.

As best seen in FIG. 1, each side of the hopper frame 30 has a longitudinal side panel 39 rigidly attached to upright members 35a and a side screen 161 which is removably attached to hopper frame 30 by suitable means.

There is mounted on hopper frame 30 an endless pair of filling belts 162 and a produce distributing belt 163 for distributing produce to the filling belts 162. The lower run of the filling belts 162 is adapted to be moved in timed relation in the same direction and above the continuously moving lines of containers for filling the containers with produce which is dropped onto the belts from the distributing conveyor belt 163.

Figure 8:
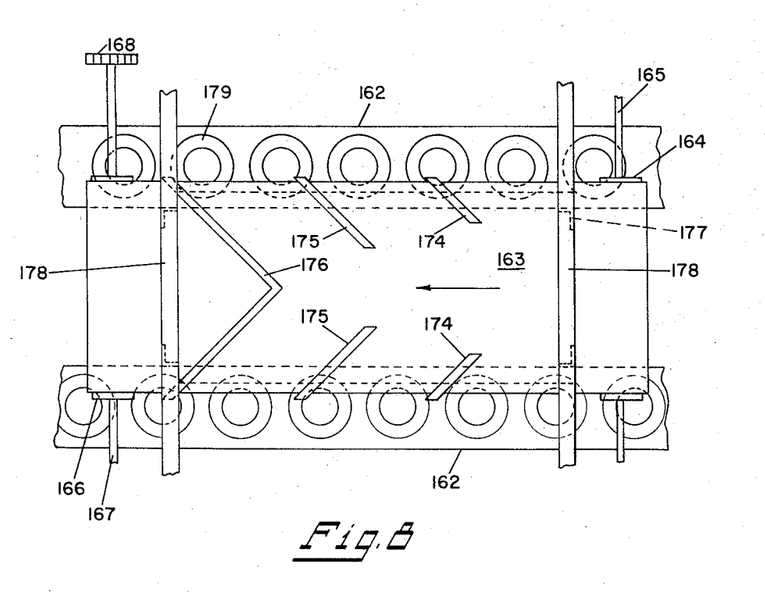
FIG. 8 is a plan view of the produce distributing conveyor of my container filling apparatus.

The distributing conveyor belt 163 is positioned in the upper portion of the hopper frame 30 above the horizontal lower run of the filling belts 162. Preferably, as best seen in FIG. 8, the sides of the distributor belt 163 extend outwardly to a position covering approximately the inner one-third of each filling belt. The distributing conveyor belt 163 is trained over an idler roller 164 mounted on an idler shaft 165 which is journaled in the side panels 39 of hopper frame 30 and over a drive roller 166 mounted on drive shaft 167 rotatably mounted in side panels 39.

As shown in FIGS. 3 and 8, one end of the drive shaft 167 extends outwardly beyond the side panel in which it is mounted. This protruding end of drive shaft 167 has a sprocket 168 attached thereto. The drive shaft 167 of the distributing conveyor belt 163 is driven from a motor 169 mounted on top of hopper frame 30. The motor 169 drives a reducer 170 through belt 171. The output shaft of reducer 170 has a sprocket 172 thereon. The sprocket 172 and the sprocket 168 on the drive shaft 167 are operatively connected by a drive chain 173. The motor 169 drives the distributing conveyor belt 163 in the direction of the arrow in FIG. 8. As best seen in FIG. 8, three sets of plows are provided for plowing produce off both sides of the produce distributing belt. The first set of plows 174 comprises a pair of diagonally disposed members each of which extends inwardly approximately one-third of the way to the center of the produce distributing belt 163 and are adapted to remove produce from the outer one-third of each side of the belt. The second set of plows 175 comprise a pair of diagonally disposed members which extend inwardly approximately two-thirds of the way to the center of belt 163 and are adapted to remove produce from the middle one-third of each side of the belt. The third plow 176 is a V-shaped member which has its vertex at the center of distributing belt 163 and is adapted to remove all of the remaining produce from the belt. The plows are mounted on a frame 177 which depends from crossmembers 178 which are secured to the upper longitudinal members 35b of hopper frame 30.

Produce may be deposited on the right end of produce distributing conveyor 163 as viewed in FIG. 8 from any suitable means such as a portable infeed conveyor (not shown). Preferably, there should be a substantially even infeed flow of produce to the distributing belt 163.

The produce which is plowed off the sides of produce distributing conveyor belt 163 falls on to the lower run of filling belts 162. The lower run of each filling belt 162 has filling chutes 179 depending therefrom, and is adapted to move in timed relation above a continuously advancing line of containers 63 for filling the containers with the produce which is dropped onto the filling belts 162 from the produce distributing conveyor belt 163.

Figure 5:
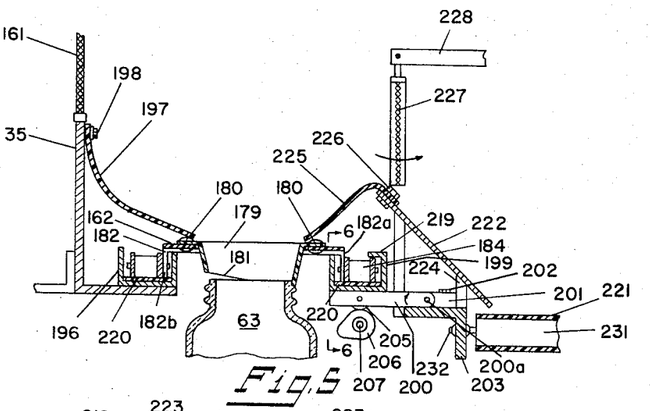
FIG. 5 is a cross-sectional view taken along line 5—5 of FIG. 1 showing a filling belt and associated mechanism.

The filling belts 162 are identical and each comprise an endless flexible belt made of rubber or similarly suitable material. As best seen in FIG. 5, the filling chutes 179 may be made of the same material as the filling belts 162 and may be attached to the belts by rivets 180 or other suitable means. The chutes 179 and the belt 162 could, of course, be molded as a single unit, if desired.

The filling chutes 179 are substantially frustoconical in shape with the lower edge 181 of the chutes being inclined from the horizontal as best seen in FIG. 5. The chutes depending from each filling belt are oriented so that the lower edge 181 inclines outwardly toward the outside of the machine. For the most efficient operation, the height of the hopper frame 30 should be adjusted so that the lowest point on the lower edge 181 of each chute is at approximately the same level as the top edge of the mouth of the container 63 to be filled as shown in FIG. 5. When in this position the uppermost point of the lower edge 181 of the filling chutes will be spaced above the top edge of the mouth of the containers as shown.

The advantage of this particular chute configuration is that it helps prevent produce from becoming clogged in the chutes 179, especially when handling produce such as whole pickles and the like. By inclining the lower edge 181 of the filling chutes 179, there is provided an increased minimum diameter for the filling chutes while still maintaining a sufficient guide for the produce in that at least a portion of the chute wall extends down to the top edge of the mouth of the container to be filled.

The chutes 179 may be provided with inserts (not shown) to facilitate the filling of quart and pint size jars.

The filling belts 162 have substantially rigid supporting ribs 182 extending across the belts between adjacent filling chutes. As best seen in FIG. 5, the ribs 182 have downwardly extending end flanges 182a and 182b which are attached to chains 183 and 184, respectively. Each of chains 183 and 184 is trained over sprockets fixedly attached to shafts 185, 186, 187 and 188. The chains 183 and 184 are driven from sprocket 190 on shaft 188. Shaft 188 extends outwardly beyond the side of the hopper frame 30 and has sprocket 190 attached on this extending end. Sprocket 190 is operatively connected by chain 191 to a sprocket 192 on main drive shaft 54 which is driven from motor 45 as described hereinbefore.

As best seen in FIGS. 1 and 3, chain 191 is of such a size that it will be extended to its full length when containers of the largest size which apparatus 10 will handle are being filled. When the hopper frame 30 is lowered by turning hand wheel 36 to facilitate the filling of smaller containers, the slack occurring in chain 191 is taken up by moving roller 193 which engages the chain 191 toward the output end of the machine. The roller 193 is rotatably mounted on a shaft 194 which may be adjusted fore and aft in the slotted bracket 195 which is fixedly secured to the longitudinal frame member 21.

The lower run of the outside chain 183 of each filling belt 162 is supported in a longitudinal channel 196 which is fixedly mounted on the lower longitudinal hopper frame member 35. Produce which is dropped from the produce distributing conveyor belt 163 is directed into the filling chutes 179 by an elongated rubber baffle 197 which extends substantially the length of the hopper frame and is securely mounted thereon by suitable means such as bolts 198.

Figure 6:
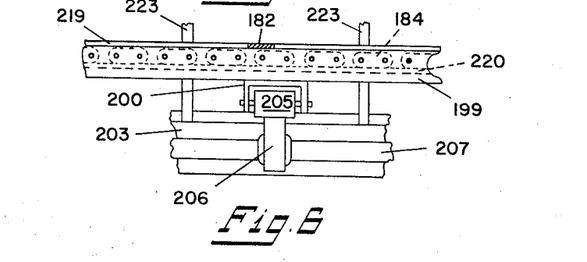
FIG. 6 is a cross-sectional view taken along line 6—6 of FIG. 5.

The lower run of the inside chain 184 of each filling belt 162 is supported in an elongated channel 199 which is mounted for imparting vibration to the inside edge of the filling belts 162 for shaking produce off the filling belts and through the chutes into the containers. As best seen in FIGS. 5 and 6, the inside channel 199 of each filling belt 162 is carried on spaced, hinged arms 200 which are pinned to hinge block 201 which, in turn, is securely attached by bolts 202 to elongated angle iron members 203. Members 203 extend the length of the hopper and are secured to hopper frame cross-members 204 as shown in FIG. 3.

FIGS. 5 and 6 show the hinge arms 200 which are comprised of inverted channel members with cam followers 205 rotatably mounted therein under chain supporting channel 199. The cam followers 205 are adapted to ride on cams 206 fixedly mounted on elongated cam shafts 207 which cause the arms to oscillate about pin 200a as shown by the arrow on arm 200 in FIG. 5. Shafts 207 are rotatably mounted in bearings 208 rigidly attached to hopper frame cross-members 204 at the ends of the hopper. Although not shown in the drawings, cam shafts 207 may be supported intermediate their ends as needed, depending on their length and diameter, by bearings which may be rigidly attached to the elongated angle iron members 203.

Referring to FIGS. 1 and 3, each cam shaft 207 is driven from motor 209 mounted on hopper frame 30 above the container output conveyor 85. The motor 209 drives a reducer 210 via gears 211 and 212. Reducer 210 has an output shaft 213 with a pair of pulleys 214 and 215 fixedly attached thereto. A pair of V-belts 216 and 217 are trained over pulleys 214 and 215, respectively, and over pulleys 218 attached to the ends of cam shafts 207.

FIG. 5 shows that the inside chain supporting channel 199 may have a flange portion 219 extending over a portion of the channel to maintain the chain 184 in the channel. Preferably, each of channels 196 and 199 have a nylon strip 220 therein on which the chains 183 and 184 ride.

An excess produce conveyor belt 221 is provided between the two filling belts 162 as shown in FIGS. 3 and 5, for carrying away any excess produce that may accumulate on the filling belts. An elongated baffle plate 222 which extends substantially the length of the hopper is mounted on angle iron members 203 by supports 223 and 224. A strip of rubber 225 or other suitably flexible material is attached by rivets or bolts 226 to the upper edge of baffle plate 222. The lower free end of strip 225 hangs down over the filling belts 162 and prevents produce from falling on chain 184. The lower edge of baffle plate 222 overhangs the edge of the excess produce conveyor belt 221 for directing excess produce from the filling belts 162 onto the excess produce conveyor belt 221. An elongated screen 227 swingably depends from a pair of supporting arms 228 and is adapted to swing in the direction of the arrow in FIG. 8 for allowing excess produce from the filling belts 162 to spill over onto the excess produce conveyor belt 221.

The excess produce conveyor belt 221 is trained over an idler roller mounted on an idler shaft 230 which is journaled in hopper frame members 203 at the rearward end of apparatus 10. As seen in FIG. 3, the excess produce conveyor belt 221 is driven from the shaft 187 over which the filling belts 162 are adapted to run. The shaft 187 is operatively connected to a sprocket 233 on the end of drive shaft 232 by chain 234.

Since the excess produce conveyor belt 221 is driven from shaft 187 it travels in the same general direction as the filling belts 162; however, since it is the top run of the excess produce conveyor belt 221 which receives produce from the bottom run of the filling belts 162, the excess produce is carried toward the infeed end of the machine by the excess produce conveyor belt 221.

The drive shaft 232 and, thus, the discharge end of excess produce conveyor belt 221 is positioned so that produce discharged therefrom falls through the main frame 20 in the area designated 235 in FIG. 2 and onto a produce recovery conveyor belt 236 shown in FIGS. 1 and 3.

The produce recovery conveyor belt 236 is mounted between the legs of main frame 20 on idler shaft 238 and on drive shaft 239 which is journaled in a bearing 240 attached to the main frame legs. The produce recovery conveyor belt 236 extends substantially outward to the inside edge of the legs of main frame 20 so as to catch the produce which is spilled during the container filling operation. Tapered guide walls 241 may be provided for directing any produce falling between longitudinal main frame members 21 and supporting channels 96 onto the recovery belt.

The produce recovery conveyor belt 236 is driven by a motor 242 which drives reducer 243 which in turn drives the recovery belt 236 via a chain 244 which is trained over sprocket 245 mounted on drive shaft 239.

The produce recovery conveyor belt 236 discharges onto a smaller transverse conveyor belt 246 which is mounted on shafts 247 and 248 journaled in bearings 249 on the forward legs of the main frame 20 and in bearings 250 on supports 251 depending from extension members 26 of the main frame 20. The transverse belt 246 is driven by shaft 248 which is driven from reducer 243 by sprockets 252 and 253 and chain 254 trained thereover.

*Operation*

The illustrated embodiment of my invention is adapted to compactly pack produce into containers which are being continuously advanced in two single-file lines.

The containers or jars 63 to be filled are placed on the container input conveyor 44 and are formed into two single-file lines by guide bars 64 mounted over the container input conveyor. The jars are then engaged by the timing screws 73 which insert individual jars between adjacent lugs on container conveyor chains 75. The bottoms of the jars in each line are supported on a pair of elongated rails 83. While being advanced by the container conveyor chains, the jars in each line are guided along the supporting rails 83 by guide belts 100, 101 and 102. The continuously advancing jars are vibrated vertically by the shaker frame 150 which is resiliently mounted on the main frame 20 of my apparatus. The shaker frame is vibrated by the rotation of an eccentric jack-shaft 154 which is driven by motor 152.

Produce may be supplied to my apparatus by any suitable produce infeed conveyor (not shown). The incoming produce is fed onto the distributing conveyor 163 which is mounted in the upper portion of the hopper 30. The produce is plowed off the sides of distributing conveyor by diagonally disposed plows 174, 175 and 176, and drops onto the lower run of the two filling belts 162. Some of the produce drops directly into and through the filling chutes 179 while the remainder drops on the areas of the filling belts between the chutes and is shaken into the chutes by the vibration imparted to the filling belts by the rotation of cam shafts 207 located below the inside edge of the filling belts. The continuously advancing filling belts 162 and the continuously advancing container conveyor chains 75 are driven at exactly the same speed so that the depending filling chutes on the bottom run of the filling belts remain directly over the mouths of the jars during the filling operation. The filled jars exit from my apparatus on the container output conveyor 85 and are formed into a single line by converging guide bars 93. The container output conveyor must, of course, travel twice as fast as the container input conveyor.

Any excess produce which might accumulate on the filling belts will be spilled over onto the excess produce conveyor 221 positioned between and slightly below the filling belts. The excess produce conveyor belt drops the excess produce onto the produce recovery conveyor 236 which also catches any produce spilled over the jars during the filling operation. The produce recovery conveyor drops its produce onto a smaller transverse conveyor 246 which carries the produce out to the side of my apparatus for collection.

Although not shown, a portable elevator conveyor can be positioned alongside my apparatus to receive the produce from transverse conveyor 246 and carry it upwardly and deposit same on the distributor conveyor belt 163 for redistribution.

It should be pointed out that my apparatus will not weigh or dispense a metered amount of produce, but will fill each jar to the limit of its volume. However, the weight of the produce packed in the jars can be controlled within limits by controlling the speed of the vibration imparted to the jars as they pass through the machine. For this reason, motor 150 is preferably a variable speed motor.

It is understood that my invention is not confined to the particular construction or arrangement of parts herein illustrated and described, but embraces all such modified forms thereof as may come within the scope of the following claims.

I claim:

1. Filling apparatus for compactly packing produce in substantially rigid, open-topped containers, comprising:
   (a) an endless filling belt having a lower run extending along a substantially straight path, an upper run, and a plurality of openings extending therethrough,
(b) a track disposed longitudinally along at least one side of the lower run of said filling belt,
(c) an endless drive chain attached to the side of said belt adjacent said track, said drive chain being carried by said track along the lower run of said belt,
(d) means for driving said chain to continuously advance said attached filling belt along said lower run,
(e) means for oscillating said track to impart vibration to said filling belt along its lower run during continuous movement thereof,
(f) conveyor means for continuously advancing a plurality of said containers in upright position along a substantially straight path in vertical alignment with said openings in the lower run of said filling belt and at the same speed as said filling belt, and
(g) a produce conveyor disposed above the lower run of said filling belt for continuously delivering produce by gravity to the lower run of said filling belt for discharge through said belt openings into said containers.

2. The invention described in claim 1 wherein said produce conveyor comprises a horizontal endless conveyor belt having one side disposed substantially in vertical alignment above said filler belt, and wherein a plurality of stationary, horizontally spaced plows extend above and across the endless conveyor belt in closely spaced relation thereto, said plows extending inwardly from the side of said conveyor belt toward the center thereof at an acute angle to the direction of travel of said belt such that produce carried by said belt is engaged by said plows and directed off the conveyor belt to the filler belt openings each succeeding plow extending further toward the center of said belt to engage produce not engaged by a preceding plow.

3. The invention described in claim 1, including means for vibrating said continuously advancing containers while produce is being discharged into said containers.

4. The invention described in claim 1, wherein filling chutes depend from said filling belt to direct produce from said belt openings into said containers, said filling chutes being substantially frustoconical in shape with the lower edges thereof being inclined from the horizontal.

5. Filling apparatus for compactly packing produce in substantially rigid, open-topped containers, comprising:
(a) conveyor means for continuously advancing a plurality of said containers,
(b) means for vertically oscillating said continuously advancing containers,
(c) an endless filling belt having a plurality of depending filling chutes adapted to move in timed relation above said continuously advancing containers, at least one side of said filling belt being fixedly attached to an endless drive chain carried in a longitudinally disposed track, said track being mounted on a plurality of hinge arms having cam followers attached thereto,
(d) a drive shaft mounted beneath and longitudinally of said filling belt, said drive shaft having a plurality of cams thereon engaging the cam followers of said hinge arms for oscillating said filling belt,
(e) means for rotating said drive shaft, and
(f) means for distributing produce to the filling chutes of said filling belt.

6. Filling apparatus for compactly packing produce in substantially rigid, open-topped containers, comprising:
(a) a main frame,
(b) conveyor means mounted on said main frame for continuously advancing a plurality of said containers in two lines,
(c) means for vertically oscillating said continuously advancing containers,
(d) a hopper frame mounted above said main frame,
(e) an endless filling belt mounted on said hopper frame above each of said container lines, said filling belts having a plurality of depending filling chutes for directing produce into said containers, at least one edge of each of said filling belts being fixedly attached to respective endless drive chains which are carried in a longitudinally disposed track, said tracks being mounted on a plurality of hinge arms having cam followers attached thereto,
(f) a drive shaft mounted on said hopper frame beneath and longitudinally of each of said filling belts, said drive shafts having a plurality of cams thereon engaging the cam followers of said hinge arms for oscillating said filling belts,
(g) means for rotating said drive shafts, and
(h) distributing conveyor means mounted on said hopper frame above and between said filling belts for distributing produce to the filling chutes of said filling belts.

References Cited by the Examiner

UNITED STATES PATENTS

| 1,413,338 | 4/1922 | Lawrence | 141—78 |
| 2,234,953 | 3/1941 | Belcher. | |
| 2,261,548 | 11/1941 | Gridley et al. | 141—133 |
| 2,626,094 | 1/1953 | McClelland et al. | 141—133 |
| 2,815,046 | 12/1957 | McBean et al. | 141—73 |
| 2,867,246 | 1/1959 | Busse | 141—79 X |
| 2,888,962 | 6/1959 | Ammon | 222—197 X |
| 3,238,979 | 3/1966 | Richter | 141—78 |

LAVERNE D. GEIGER, *Primary Examiner.*

SAMUEL ROTHBERG, E. J. EARLS, *Examiners.*